(12) United States Patent
Verma

(10) Patent No.: US 11,550,832 B2
(45) Date of Patent: Jan. 10, 2023

(54) SYSTEMS AND METHODS FOR MICRO-CREDENTIAL ACCREDITATION

(71) Applicant: Birchhoover LLC, Denver, CO (US)

(72) Inventor: Geeta Verma, Denver, CO (US)

(73) Assignee: BIRCHHOOVER LLC

( * ) Notice: Subject to any disclaimer, the term of this patent is extended or adjusted under 35 U.S.C. 154(b) by 0 days.

(21) Appl. No.: 17/492,069

(22) Filed: Oct. 1, 2021

(65) Prior Publication Data
US 2022/0147548 A1 May 12, 2022

Related U.S. Application Data

(60) Provisional application No. 63/087,072, filed on Oct. 2, 2020.

(51) Int. Cl.
| | |
|---|---|
| *G06F 16/00* | (2019.01) |
| *G06F 16/33* | (2019.01) |
| *G06F 16/9032* | (2019.01) |
| *G06F 16/903* | (2019.01) |
| *G06F 16/335* | (2019.01) |
| *G06F 40/289* | (2020.01) |
| *G06F 16/215* | (2019.01) |

(Continued)

(52) U.S. Cl.
CPC ........ *G06F 16/3335* (2019.01); *G06F 16/335* (2019.01); *G06F 16/3334* (2019.01); *G06F 16/3346* (2019.01); *G06F 16/90328* (2019.01); *G06F 16/90344* (2019.01); *G06F 40/289* (2020.01); *G06F 3/04895* (2013.01); *G06F 16/215* (2019.01); *G06F 16/2462* (2019.01); *G06Q 50/2057* (2013.01)

(58) Field of Classification Search
CPC .............. G06F 16/215; G06F 16/2462; G06F 16/3334; G06F 16/3335; G06F 16/3346; G06F 16/335; G06F 16/90328; G06F 16/90344; G06F 3/04895; G06F 40/289; G06Q 50/2057
See application file for complete search history.

(56) References Cited

U.S. PATENT DOCUMENTS

| | | | |
|---|---|---|---|
| 8,764,454 B1 * | 7/2014 | Turner | G09B 19/00 434/323 |
| 2003/0233242 A1 * | 12/2003 | Wenger | G06Q 10/10 705/328 |

(Continued)

OTHER PUBLICATIONS

PCT Application No. PCT/US2021/053132, International Search Report and Written Opinion, dated Dec. 23, 2021, 12 pages.

*Primary Examiner* — Diedra McQuitery
(74) *Attorney, Agent, or Firm* — Lathrop GPM LLP

(57) ABSTRACT

Systems and methods provide micro-credential accreditation. The systems and methods analyze, using one or more prediction models, received text submissions received from applicants via interaction with an applicant device. The prediction model(s) fit one or more micro-credentials to the received text submission, which may collectively or independently qualify the applicant for one or more accreditation credits. By processing the received text submission, the systems and methods allow for consistent and standard output of micro-credentials by the prediction model(s). Furthermore, the systems and methods provide for monitoring the prediction model output(s) to ensure ethical fairness across varying demographic groups of applicants.

12 Claims, 20 Drawing Sheets

(51) Int. Cl.
  *G06F 16/2458* (2019.01)
  *G06F 3/04895* (2022.01)
  *G06Q 50/20* (2012.01)

(56) References Cited

U.S. PATENT DOCUMENTS

| | | |
|---|---|---|
| 2006/0123000 A1 | 6/2006 | Baxter et al. |
| 2008/0249764 A1 | 10/2008 | Huang et al. |
| 2013/0268519 A1* | 10/2013 | Cucerzan .............. G06F 16/951 707/723 |
| 2013/0273517 A1* | 10/2013 | Lettrick ................. G09B 7/00 434/362 |
| 2014/0242565 A1 | 8/2014 | Abts |
| 2015/0052075 A1* | 2/2015 | Jayadevan ............ G06Q 10/10 705/327 |
| 2015/0213460 A1 | 7/2015 | Anderson et al. |
| 2015/0242979 A1* | 8/2015 | Abts ................. G06Q 50/2057 705/328 |
| 2015/0317610 A1 | 11/2015 | Rao et al. |
| 2018/0293373 A1* | 10/2018 | Johnson ............... G06F 21/604 |
| 2018/0330331 A1 | 11/2018 | Nair et al. |
| 2019/0087833 A1* | 3/2019 | Mercury ............ H04L 63/0861 |
| 2020/0026773 A1 | 1/2020 | Verstraete |
| 2020/0134058 A1 | 4/2020 | Liu et al. |
| 2020/0250242 A1* | 8/2020 | Fanberg ................ G16H 15/00 |
| 2020/0342361 A1* | 10/2020 | Mroueh ............... G06K 9/6288 |
| 2021/0089667 A1* | 3/2021 | Kadi .................. G06F 21/6245 |
| 2021/0233008 A1* | 7/2021 | Gupta ................. G06V 10/762 |
| 2021/0319333 A1* | 10/2021 | Lee ...................... G06N 20/20 |

* cited by examiner

Submit Experience — 302

[ Action ▾ ]   [ Helped others ▾ ] — 304

Where did this experience take place?
- ☐ Home
- ☐ Work
- ☐ School/College
- ☐ Shopping and other outside areas
- ☐ Other

— 306

[ << Back ]   [ Next >> ]

FIG. 3

Submit Experience

[ Action ▾ ]   [ Helped others ▾ ]

Who was involved in this experience?
- ☐ Family Members
- ☐ Coworkers/Team Members
- ☐ Friends
- ☐ Strangers — 402
- ☐ Neighbors
- ☐ Only Myself
- ☐ Community Members
- ☐ Others

[ << Back ]   [ Next >> ]

| Submit Experience | Save as draft | Clear Draft | ✕ |

[Action ▾]   [Helped others ▾]

1. Describe the experience

A. Briefly describe your experience – you could share a brief story of what happened (1-3 sentences)

[                                                                    502 ]

B. What were your thoughts and feelings in this experience (e.g., emotions and body sensations)? (1-3 sentences)

[                                                                    504 ]

[<< Back]                                              [Next >>]

FIG. 5

| Submit Experience | Save as draft | Clear Draft | ✕ |

| Action ▼ | Helped others ▼ |

2. Describe your actions and learnings

A. What actions did you take? (1-3 sentences)

[                                                    ]

B. What did you learn from this experience? (1-3 sentences)

[                                                    ]

| << Back | Next >> |

| Submit Experience | Save as draft | Clear Draft | ✕ |

[ Action ▾ ]  [ Helped others ▾ ]

3. Moving forward
A. What would you do differently - it's totally fine if things went well and you wouldn't do anything different? (1-3 sentences)

[                                                                       ]

[ << Back ]                                                [ Next >> ]

| Submit Experience | Save as draft | Clear Draft | ✕ |

[Action ▼]   [Helped others ▼]

4. Please select the areas of your sbumitted experience. You can choose maximum of two categories.

| Advance Placement... | Co-curricular/out ... | Cont. ... | Internships/Apprenticeships |

Advance Placement Course/s
☐ AP Calc AB      ☐ AP Calc BC     ☐ AP Government
☐ AP Geography    ☐ AP Lang        ☐ AP Lit
☐ AP Psychology   ☐ AP Stats       ☐ AP US History

[<< Back]                                    [Next >>]

| Submit Experience | Save as draft | Clear Draft | ✕ |

[Action ▾]  [Helped others ▾]

6. What content area would you associate this lived experience with – Select up to two categories

- ☐ Engineering
- ☐ Environmental Literacy
- ☐ Computer Science
- ☐ Mathematics
- ☐ Management
- ☐ Global Issues
- ☐ Healthcare
- ☐ Technical Education
- ☐ Sports
- ☐ Peer Mentoring

- ☐ Business
- ☐ Arts/Culture
- ☐ Science
- ☐ Literature
- ☐ Architecture
- ☐ Languages
- ☐ Agriculture/Farming
- ☐ Education
- ☐ Media
- ☐ Other

[<< Back]   [Next >>]

FIG. 9

| Submit Experience | Save as draft | Clear Draft | × |

| Action ⌄ | | Helped others ⌄ |

If asked for evidence to support your narrative, which of the following would you be able to submit?

☐ Note from a teacher, parent, caregiver, or another adult
☐ A selfie or another photo evidence
☐ A document evidence
☐ Any other

| << Back | | Next >> |

FIG. 10

| | | Sr.No | Experience ID | Date | Narratives | Action |
|---|---|---|---|---|---|---|
| 1. SOCIAL EMOTIONAL | | | | | | |
| External Strengths and Skills | 3 | 1 | 1 | 2019-09-17 | I meditated for 20 minutes before going ... | View |
| Internal strengths & Skills | 6 | | | | | |
| Perspective Taking | 22 | 2 | 37 | 2019-10-24 | I presented my research to a group of 40... | View |
| Thoughts, emotions, and behaviors | 17 | | | | | |
| 2. ACADEMIC & PROFESSIONAL SKILLS | | 3 | 40 | 2019-10-24 | I went to work and worked on a project w... | View |
| Accessing and providing support & resources | 7 | 4 | 85 | 2019-10-31 | I serve on a big committee and a colleag... | View |
| Decision Making | 3 | 5 | 202 | 2019-11-25 | tadtadta, tdafadta, tadfadadt. | View |
| Foundational | 15 | | | | | |
| Leadership | 2 | 6 | 435 | 2019-12-29 | I worked with my sister to resolve a fam... | View |
| Professionalism | 2 | | | | | |
| Responsible Behavior | 17 | 7 | 3228 | 2020-03-06 | fadfadfadfadfadfa, fafafadfadsfa, faf... | View |
| 3. COLLABORATION | | | | | | |

FIG. 20

| Sample | |
|---|---|
| I worked with my sister to resolve a family conflict related to my mother's health. She did not do her part and that led to my mother's deteriorating health. I learnt that I can not trust and rely on my sister. I would have found other people to take care of my mum's health and manage the situation. I will identify 2-3 resource people and keep in touch with them to make sure that this doesn't happen again. | |
| 1. SOCIAL EMOTIONAL | 3 |
| Thoughts, emotions, and behaviors | 1 |
| Internal strengths & Skills | 1 |
| Perspective Taking | 1 |
| 5. GLOBAL CITIZENSHIP | 2 |
| Supports Personal Health | 1 |
| Supports Others Health | 1 |
| 6. INNOVATION & CRITICAL THINKING | 6 |
| Problem Solving | 2 |
| Reflective Practices | 1 |
| Foundational | 3 |

SYSTEMS AND METHODS FOR MICRO-CREDENTIAL ACCREDITATION

RELATED APPLICATIONS

This application claims priority to U.S. Provisional Application Ser. No. 63/087,072, entitled "System and Method for Micro Credential Accreditation", filed on Oct. 2, 2020, and which is incorporated herein by reference in its entirety.

BACKGROUND

As the result of a long and complex history of racism, classism and oppression, minority individuals lag behind their majority peers in academic achievement, career readiness, and career enhancement. This lag has been influenced by structural inequalities such as those framed by poverty, migration, and/or undocumented status or homelessness. (Massey, D. S., & Denton, N. A. (1993). *American apartheid: Segregation and the making of the underclass*. Harvard University Press). This lag has also been called an opportunity gap because, in part, minoritized individuals lack access to the majority peers' experiences and discourses upon which educational and professional achievement is defined. (Carter, P. L., & Welner, K. G. (Eds.). (2013). *Closing the opportunity gap: What America must do to give every child an even chance*. Oxford University Press). As such, the lived experiences of minoritized individuals are often defined in terms of deficits and do not carry the cultural capital found in more privileged students' experiences (AP courses, early college, funded extracurricular experiences, gap year opportunities). Yet, many minoritized individuals bring a unique set of life experiences (e.g., immigrant families, resilience, perseverance, stress management, and conflict resolution) that have provided them with the skills and competencies that are key outcomes that could provide alternative affordances (e.g., bilingualism, problem-solving, critical thinking, collaboration). The embodiments discussed herein turn the unequal backgrounds and social circumstances that are part of many minoritized individuals' lives into assets through a process of drawing upon and documenting their lived experiences within the language of educational, social, and cultural capital. (Darling-Hammond, L. (2015). *The flat world and education: How America's commitment to equity will determine our future*. Teachers College Press).

SUMMARY

The systems and methods herein recognize that unequal backgrounds and social circumstances are part of many minoritized individuals' lives and that these circumstances are underrepresented in credentials for applications such as college. The systems and methods herein address this recognition by turning these backgrounds and circumstances into assets through a process of drawing upon and documenting their lived experiences within the language of educational, social, and cultural capital. Moreover, the systems and methods do so in a technical manner that allows for differing levels of input to be normalized so that each background and circumstance can appropriately, and ethically, be turned into a useable credential.

In this disclosure, lived experiences (LivedX) are understood from a phenomenological perspective and through a Funds of Knowledge framework. Phenomenology allows for an exploration of Lived Experiences as a function of being in the world, encounters with others, temporality, spatiality, and a focus on personal existence. (Heidegger, M. (2008). *Being and Time*. New York, N.Y.: Harper Perennial). The below-discussed framework provides a way for situating personal existence within a sociocultural and sociopolitical framework as "historically accumulated and culturally developed bodies of knowledge and skills for household or individual functioning and well-being." (Moll, L. C., Amanti, C., Neff, D., & Gonzalez, N. (1992). Funds of knowledge for teaching: Using a qualitative approach to connect homes and classrooms. *Theory into practice*, 31(2), 132-141). Peoples' lives are not blank slates and their Lived Experiences are unique and different for each individual while being central to their existence. Furthermore, Lived Experiences are rich in meaning and imbued with skills and competencies and recognizing, validating, and valuing students' Lived Experiences can play an important role in bridging the opportunity gap in educational achievement, career pathways and enhancement.

Every day we develop a skill or up skill ourselves by doing basic tasks at home, school, work, internships, apprenticeships, and volunteer activities. These skills do not receive their due credit in educational and workplace settings. Something as small as planning a trip over the weekend involves many skills such as time management, financial management, collaboration, communication, coordination and many more. Until now these life skills also known as soft skills, highly valuable skills, marketable skills, essential life skills, and/or power skills (individually and collectively referenced herein as "skills") have not been recognised. The systems and methods disclosed herein allow for documentation of individuals' life experiences (also known as lived experiences). However, mere documentation has limitations in that such documented life experiences must be appropriately validated and assigned a credential amount. The systems and methods apply technical AI and Machine learning to validate these skills embedded in each experience, issue micro-credentials, and accredit them in a manner that is trustworthy, and useable without breaching ethical considerations.

The present disclosure describes a skills documentation system that bridges the gap between individual users, educational organizations, and companies to assist with college admissions, new employee recruitment, career pathways, and career enhancement. The system can be used by individuals to match their skills with ideal career fields, connect with learning content, and peer and adult mentors. The system employs education and psychology frameworks to create a skills profile to provide additional data for college admissions, career recommendations, and job recruitment for employers. The systems and methods herein utilize an online portal that translates peoples' everyday life experiences into trusted credentials using research frameworks and proprietary Machine Learning technology. The systems and methods result in a portfolio of highly valued skills sought and recognized and trusted by educational institutions and workplaces. The systems and methods herein focus on amplifying skills and talents not often recognized in traditional admission or hiring processes.

BRIEF DESCRIPTION OF THE DRAWINGS

FIGS. 3-10 show example prompts presented to applicant via applicant device of FIG. 1 to obtain a text submission, in embodiments.

FIGS. 18-21 show example displays for filtering previously submitted text submissions for micro-credential accreditation, in embodiments.

DETAILED DESCRIPTION

Figure 1:
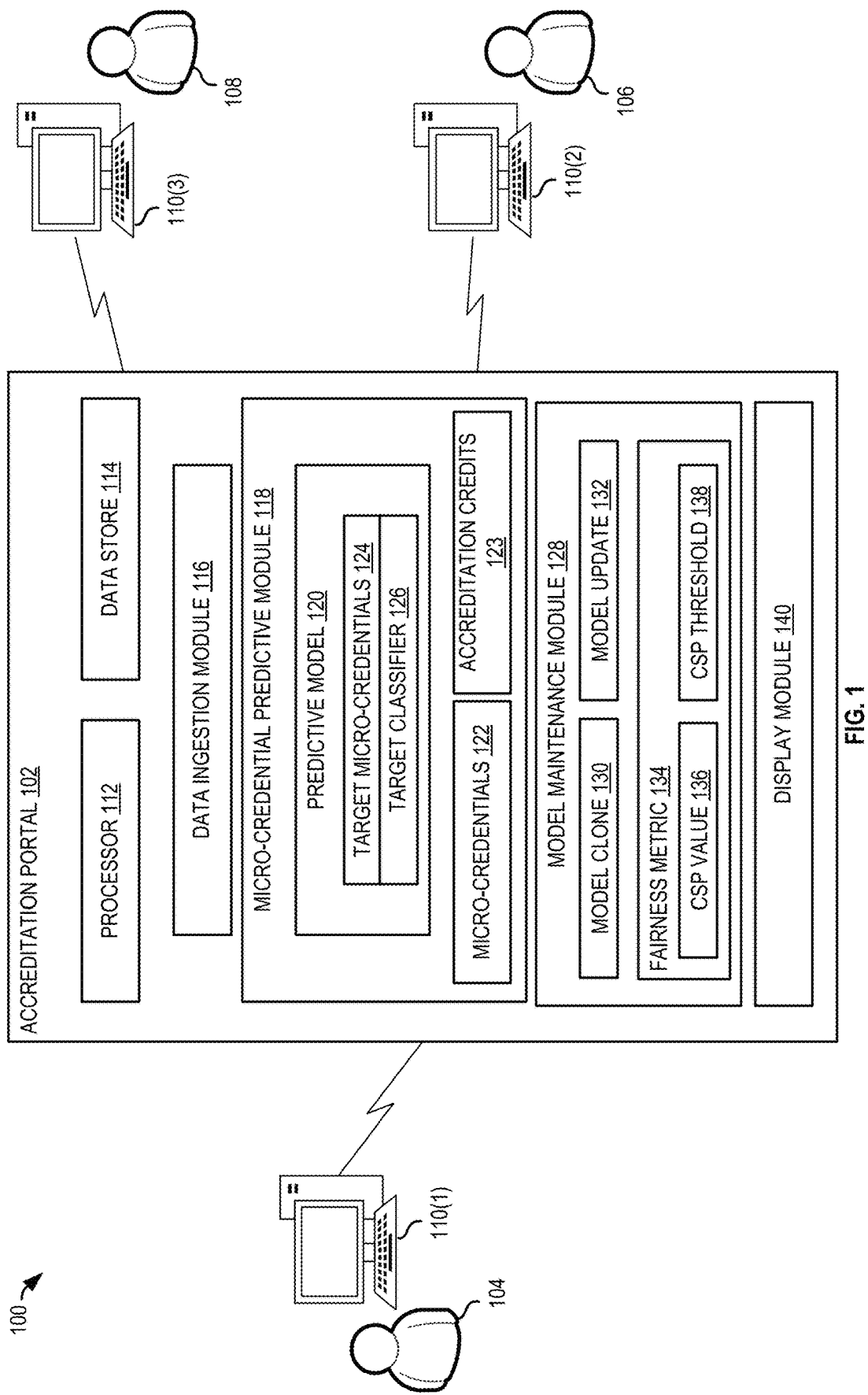
FIG. 1 shows a system for micro-credential accreditation, in embodiments.

FIG. 1 shows a system 100 for micro-credential accreditation, in embodiments. System 100 includes an accreditation portal 102 that is accessible by one or more applicants 104 (e.g., people desiring to have micro-credentials, or other life experiences accredited), accreditors 106 (e.g., persons, or entities such as universities, workplaces, etc. that are providing credit for the applicants' lived experiences), and administrators 108 (e.g., personnel that manage the accreditation portal 102, which may be the same as or different than the accreditors 106).

Accreditation portal 102 may be a server, or other external or cloud-hosted system, that provides functionality discussed herein. Thus, accreditation portal 102 may host, or otherwise control, web-based access portal that the applicant 104, accreditors 106, and administrators 108 access via computing devices 110. Computing devices 110 may be any one or more of a laptop computer, desktop computer, smart phones, tablets, and other devices capable of accessing the web browser, or other portal, hosted by accreditation portal 102. Computing device 110(1) may be referred to herein as applicant device 110(1). Computing device 110(2) may be referred to herein as accreditor device 110(2). Computing device 110(3) may be referred to herein as administrator device 110(3).

Accreditation portal 102 includes one or more processors 112 and a data store 114 that stores necessary data to implement the functionality of one or more of a data ingestion module 116, a micro-credential predictive module 118, and generated micro-credentials 122 and associated accreditation credits 123 (which may be one or more combined micro-credentials 122 that collectively qualify the applicant 104 for a given accreditation credit 123, as configured by the administrator 108 or accreditor 106 interacting with their given computing device 110 to set user-specific configuration settings of the accreditation portal 102). The processor 112 may be any type of circuit or integrated circuit capable of performing logic, control, and input/output operations. For example, the processor 112 may include one or more of a microprocessor with one or more central processing unit (CPU) cores, a graphics processing unit (GPU), a digital signal processor (DSP), a field-programmable gate array (FPGA), a system-on-chip (SoC), a microcontroller unit (MCU), and an application-specific integrated circuit (ASIC). The processor 112 may also include a memory controller, bus controller, and other components that manage data flow between the processor 112, data store 114, and other components connected to the processor 112.

The data store 114 (also referred to as memory) includes one or more memory allocations that store machine-readable instructions that, when executed by the processor 112, control the portal 102 to implement the functionality and methods described herein. Said machine-readable instructions, when executed by processor 112, implement the various "modules" discussed herein. Data store 114 additionally stores necessary data to implement the functionality and methods described herein.

Accreditation portal 102 may interface with devices 110 to ingest necessary data (e.g., text describing lived experiences submitted to the portal by the applicant 104), and display the associated micro-credentials 122 and associated accreditation credits 123. The lived experience texts are collected via the devices 110(1) detecting interaction by the applicant 104 with the hosted platform by accreditation portal 102 via applicant device 110(1). Various API calls and responses are utilized between the accreditation portal 102 and the device 110(1) to receive the necessary information.

Figure 2:
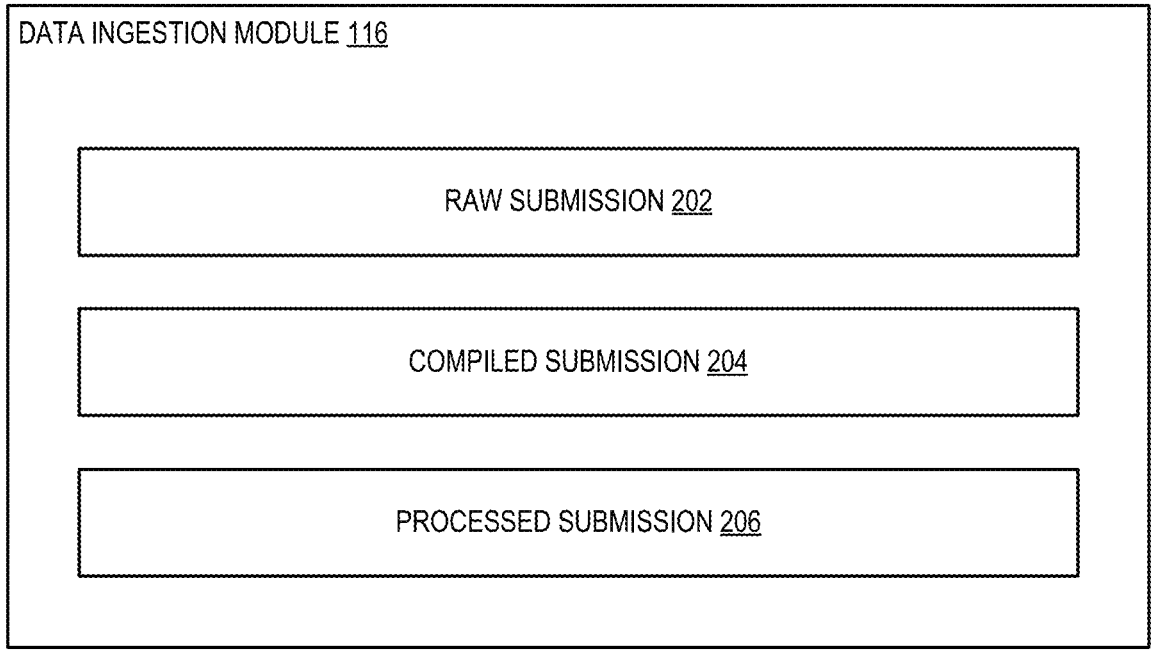
FIG. 2 shows the data ingestion module of FIG. 1, in further detail.

FIG. 2 shows the data ingestion module 116 of FIG. 1, in further detail. Applicant 104 interacts with device 110(1) to provide a lived experience submission, which is received by accreditation portal 102 through one or more API calls/responses. Raw submission 202 is stored in a data store 114 of the accreditation portal 102.

FIGS. 3-11 show example prompt/response flow that is displayed on device 110(1) for the applicant 104 to input a submission that is stored as raw submission 202, in an embodiment.

Screenshot 300, of FIG. 3, shows a screenshot where the applicant 104 is provided with a prompt on device 110(1) to select an experience in the pre-existing categories 302 (such as, but not limited to: action, process, quality), sub-categories 304 (e.g., type of action), and location 306 (e.g., home, work, school, shopping, other). This allows the applicant 104 to identify and focus on a recent experience that might be of importance/value to them and they are interested in documenting.

Screenshot 400, of FIG. 4, shows a screenshot where the applicant 104 is provided with a prompt on device 110(1) to select additional people involved in the experience represented in the current submission. Since the applicant 104 is submitting their lived experience, the prompt in screenshot 400 prompts applicants to indicate where the experience took place and who participating with them in the experience. This helps the applicant 104 contextualize the experience they are planning to submit. This also allows applicant 104 to submit a diversity of experiences in terms of location and various aspects of their life.

Screenshot 500, of FIG. 5, shows a screenshot where the applicant 104 is provided with a prompt on device 110(1) to select provide a text description of the lived experience. This prompt (describe what happened in this experience) sets the stage for the user for submitting the experience. By asking them to describe the experience (thoughts and feelings), the prompt in screenshot 500 narrows down or make the experience focused on specific events (rather than a sequence of events) and allows the accreditation portal 102 to be able to interpret the applicant's 104 understanding of their experience.

Screenshot 600, of FIG. 6, shows a screenshot where the applicant 104 is provided with a prompt on device 110(1) to select provide additional text description of the lived experience. This prompt (what did you learn from this experience) is used to help the applicant 104 concretized their actions (e.g., in difficult situations) and use the experience as a learning tool from the past experience as well moving forward.

Screenshot 700, of FIG. 7, shows a screenshot where the applicant 104 is provided with a prompt on device 110(1) to select provide additional text description of the lived experience. This prompt (what would you do differently) is used to help the applicant 104 describe what and how much they learned from the experience, be it whether they did the right thing in their view (and wouldn't do anything differently), or did something wrong and would change how their actions in similar situations.

Screenshot 800, of FIG. 8, shows a selection prompt requesting the applicant 104 to select a content area (e.g., category) to which the submitted text applies. Screenshot 800 is in an example of AP courses for college credit, however other categories may be prompted depending on the applicant 104 and target micro-credentials. Screenshot 900, of FIG. 9, shows alternate categories provided in the content-area prompt. Additional categories include engineering, business, environmental literacy, arts/culture, computer science, science, mathematics, literature, management, architecture, global issues, languages, healthcare, agriculture/farming, technical education, education, sports, media, peer mentoring, other.

Screenshot 1000, of FIG. 10, shows a selection prompt requesting the applicant 104 to provide evidence (or indicate they could provide evidence) of the submitted experience. This allows the portal 102 to have an understanding of the veracity of the submitted experience.

Figure 11:
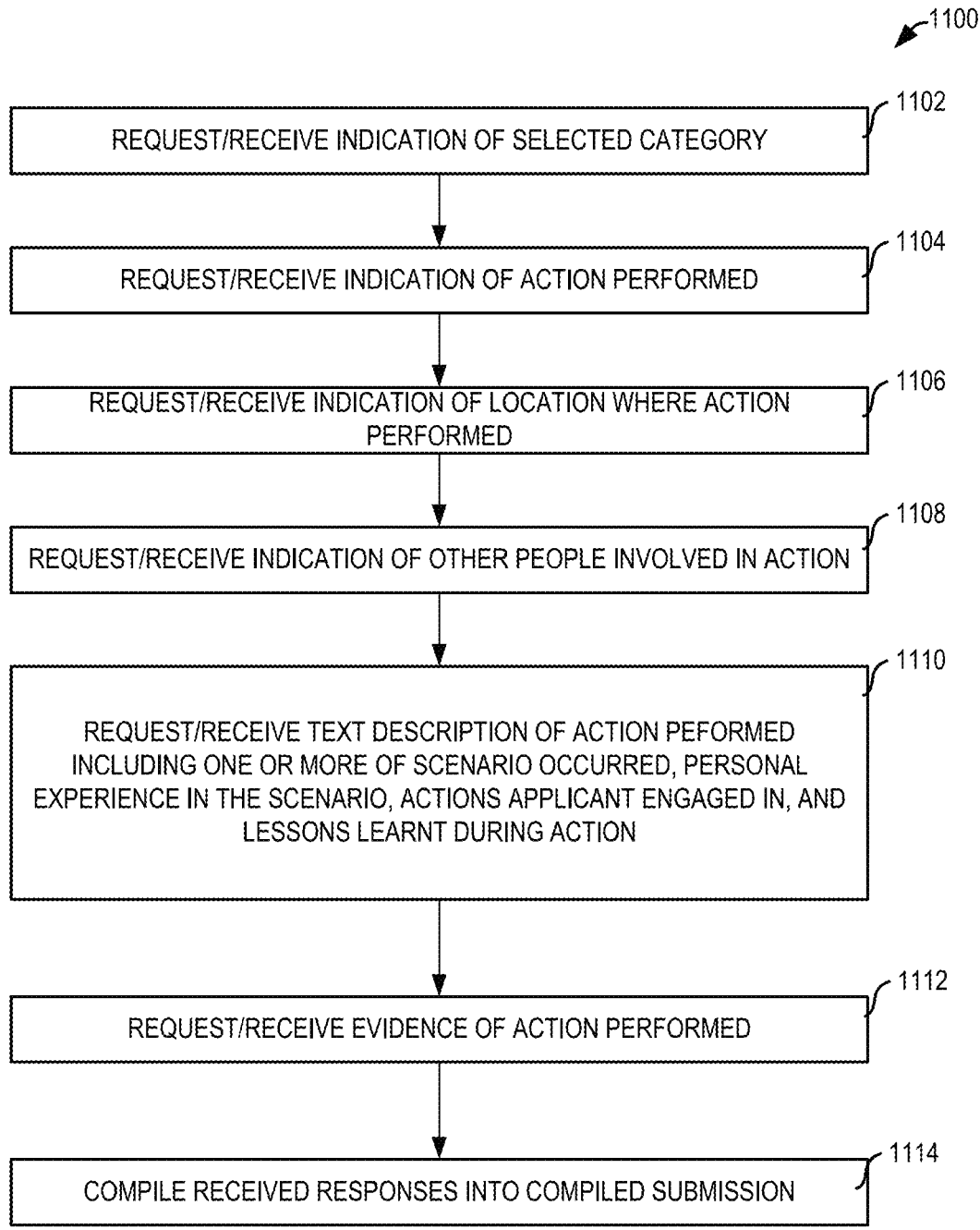
FIG. 11 shows an example method for requesting and/or receiving text submission data for converting to a micro-credential, in embodiments.

FIG. 11 shows an example method for requesting and/or receiving, from applicant 104, data for converting to a micro-credential, in embodiments. Method 1100 is performed using system 100, such as execution of the data ingestion module 116, for example.

In block 1102, the method 1100 requests/receives an indication of a selected category associated with a submitted data. In one example of block 1102, the data ingestion module 116 implements one or more API calls/responses to/from the user device 110(1) to receive a selected category (e.g., drop-down menu 302 of FIG. 3).

In block 1104, the method 1100 requests/receives an indication of an associated event that occurred that is associated with a submitted data. In one example of block 1104, the data ingestion module 116 implements one or more API calls/responses to/from the user device 110(1) to receive a selected action (e.g., drop-down menu 304 of FIG. 3). Selectable choices presented to the Applicant 104 (e.g., via device 110(1)) may be pre-determined based on the selection in step 1102.

In block 1106, the method 1100 requests/receives an indication of a location where the associated event occurred and is associated with a submitted data. In one example of block 1106, the data ingestion module 116 implements one or more API calls/responses to/from the user device 110(1) to receive a selected location (e.g., selection list 306 of FIG. 3). Selectable choices presented to the Applicant 104 (e.g., via device 110(1)) may be pre-determined based on the selection in one or both of step 1102 and 1104.

In block 1108, the method 1100 requests/receives an indication of other persons that were involved in the associated event and is associated with a submitted data. In one example of block 1108, the data ingestion module 116 implements one or more API calls/responses to/from the user device 110(1) to receive a selected action (e.g., selection list 402 of FIG. 4). Selectable choices presented to the Applicant 104 (e.g., via device 110(1)) may be pre-determined based on the selection in one or more of steps 1102-1106.

In block 1110, the method 1100 requests/receives a text description of the associated event and is associated with a submitted data. In one example of block 1110, the data ingestion module 116 implements one or more API calls/responses to/from the user device 110(1) to receive a text description including one or more of the scenario/event that occurred, personal experience in the scenario/event, actions the applicant 104 engaged in, and lessons learnt during the scenario/event (e.g., input to the prompts shown in FIGS. 5-7). Selectable choices presented to the Applicant 104 (e.g., via device 110(1)) may be pre-determined based on the selection in one or more of steps 1102-1106.

In block 1112, the method 1100 requests/receives an indication of available evidence, or the evidence itself, of the associated event and is associated with a submitted data. In one example of block 1112, the data ingestion module 116 implements one or more API calls/responses to/from the user device 110(1) to receive an indication of available evidence, or the evidence itself (e.g., response to prompt shown in FIG. 10).

The responses received in blocks 1102-1112 may be saved collectively or individually as raw submission 202 of FIG. 2. In block 1114, the method 1100 may compile the responses into a complied submission 204. Referring back to FIG. 2, the raw submission 202 may be a series of data responses received in response to any one or more of the above-discussed prompts. These responses are then, by the data ingestion module 116, formatted into a compiled submission 204. Compiled submission 204 takes the disparate responses to the prompts and puts them into a text string describing the input experience. In the text string of the compiled response 204, prompts that have a selectable answer (e.g., 302, 304, 306 of FIG. 3) may be compiled into a first portion of the text string, and prompts that have a text-input response (e.g., input 502, 504 of FIG. 5) may be included as-is as a second portion of the text string. Below is an example of submitted narrative:

> This experience took place at my [Other]. I was with some Strangers. I was at the DMV and saw someone trying to ask for the bathroom in ASL. I knew what they were saying so I stood up and helped them find the bathroom. I learned that it does not matter where you are and what you are doing, helping someone who needs it is important. I would not do anything different next time.

"This experience too place at my [other]." is generated in response to a selection in input drop-down 302. "I was with some Strangers." is generated in response to selection of box 402 of FIG. 4.

Auto-generating the narrative, as opposed to allowing the user to simply input a narrative and output what the user inputs, allows for a consistently formatted narrative for review. Thus, each user's lived experience can be accurately analyzed by the back-end system, or a reviewer at a work, college, school, etc., to provide an appropriate one or more micro credentials therefore.

Data ingestion module 112 may further process the compiled data 204 (e.g., after implementation of method 1100), to generate processed submission 206. The data ingestion module 112 may generate processed submission 206 by processing the compiled text data 204 to prepare for classification by the predictive model 120 of micro-credential predictive module 118 (FIG. 1) to generate one or more micro-credentials 122 which may, independently or in combination, qualify the applicant 104 for one or more accreditation credits 123. To generate the processed submission 206, the data ingestion module 112 may remove stop words within the compiled data 204, implement stemming on the compiled data 204, implement lemmatization on the compiled data 204, convert the compiled data 204 to a plurality of N-Grams, covert the compiled data 204 (after any one or more of the above pre-processing techniques) into the term-frequency inverse document frequency (tf-idf) matrix.

Figure 12:
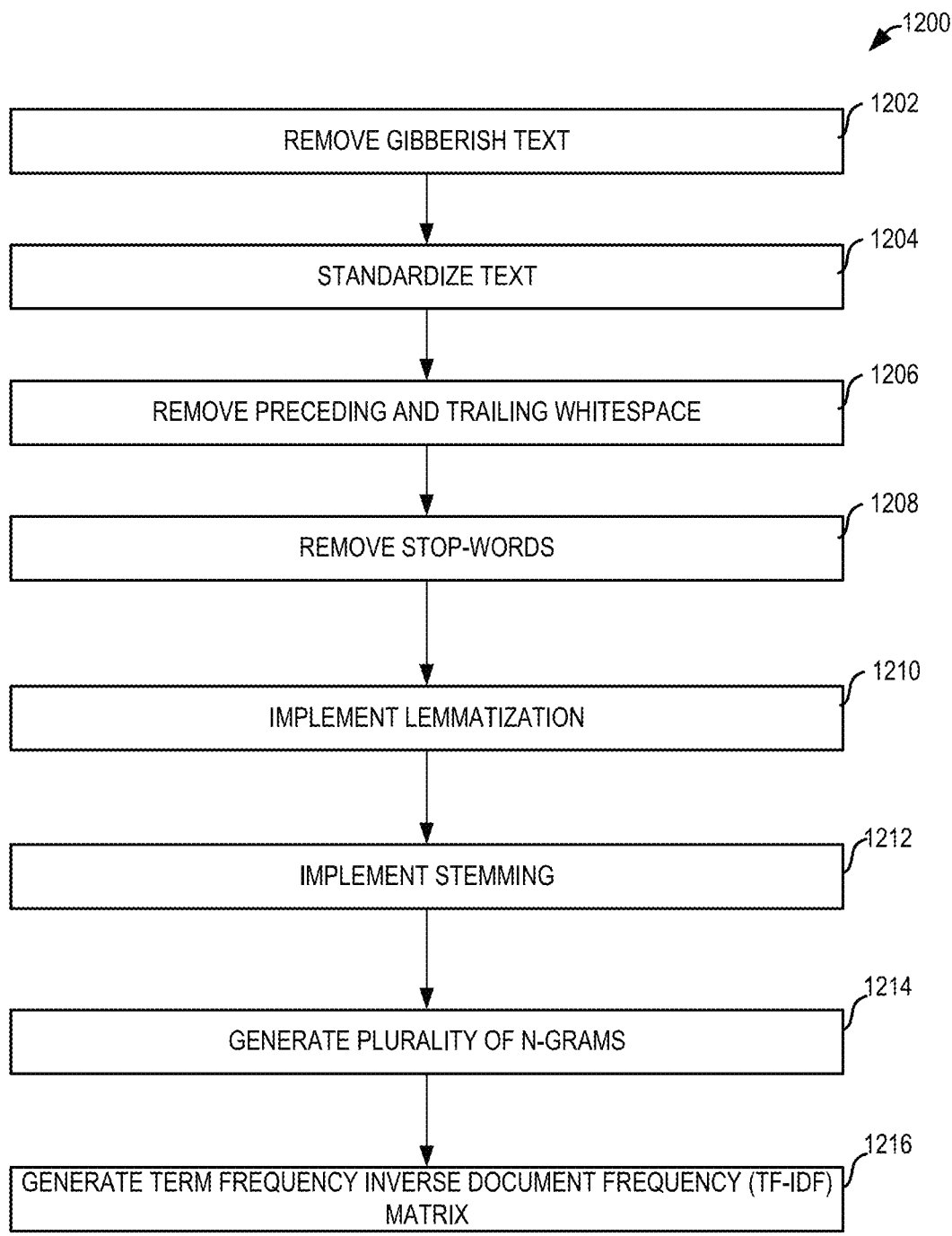
FIG. 12 shows a method for converting compiled data into a pre-processed submission ready for classification by a micro-credential predictive module, in an embodiment.

FIG. 12 shows a method 1200 for converting the compiled data 204 into a pre-processed submission 206 ready for classification by the micro-credential predictive module 118, in an embodiment. Method 1200 is implemented by the data ingestion module 112, for example.

In block 1202, gibberish text within complied data 204 is removed. In one example of block 1202, the data ingestion module 112 analyzes the complied data 204 and removes text that is incoherent, and unable to be corrected via spell-check, or other correction methods.

In block 1204, the remaining complied data 204 is standardized. In one example of block 1204, the data ingestion module 112 analyzes the remaining complied data 204 after block 1202 and standardizes the text. The text may be standardized by performing spell check, removing redundant and/or duplicate words, etc.

In block 1206, whitespace within complied data 204 is removed. In one example of block 1206, the data ingestion module 112 analyzes the complied data 204 and removes whitespace that is within, before, or after the text portion of the submission.

In block 1208, stop-words within the remaining complied data 204 are removed. In one example of block 1208, the data ingestion module 112 analyzes the remaining complied data 204 and removes stop-words therein. Extremely common words in text which would appear to be of little value in helping select micro-credentials matching the submitted experience by the applicant 104 are excluded from the vocabulary entirely. These words are referred to herein as "stop words." Stop words include, but are not limited to, words such as "the", "is", "are", and so on. The general strategy for determining a stop word list is to sort the terms by occurrence frequency in a particular experience text document, and then to take the most frequent terms, often hand-filtered for their semantic content relative to the domain of the documents being indexed, as a stop list, the members of which are then discarded during indexing. In some natural language processing applications stop word removal will have very little impact on its predictive performance, rather it reduces computational complexity of training the model.

In block 1210, stemming on the remaining complied data 204 is implemented. In one example of block 1210, the data ingestion module 112 analyzes the remaining complied data 204 after block 1208 and implements stemming. Stemming may be performed after other blocks within method 1200 without departing from the scope hereof. Stemming is used in information retrieval systems to make sure variants of words are not left out when text is retrieved (Julie Beth Lovins. 1968. Development of a stemming algorithm. Mech. Transl. Comput. Linguistics, 11(1-2):22-31.). The process is used in removing derivational suffixes as well as inflections (i.e. suffixes that change the form of words and their grammatical functions) so that word variants can be conflated into the same roots or stems. For example, words like "playing", "plays", "played" have the same common root "play". Therefore, by stemming we transform all the word derivations into their corresponding root. It also reduces computational complexity of the process, and increase predictive performance of the model. In one embodiment, blcok 1210 implmeents Porter's stemmer. (Porter, M. F., 1980. An algorithm for suffix stripping. Program; which is incorporated by reference herein).

In block 1212, lemmatization on the remaining complied data 204 is implemented. In one example of block 1212, the data ingestion module 112 analyzes the remaining complied data 204 after block 1210 and implements lemmatization. Lemmatization may be performed after other blocks within method 1200 without departing from the scope hereof. Lemmatization puts emphasis on vocabulary and morphological analysis of word and tries to remove inflectional endings, thereby returning words to their dictionary form. Lemmatization checks to make sure that words are properly used in text. For example, it analyzes if query words are used as verbs or nouns.

In block 1214, a plurality of N-grams is generated from the remaining complied data 204 is implemented. In one example of block 1214, the data ingestion module 112 analyzes the remaining complied data 204 after block 1212 and generates a plurality of N-grams. N-gram generation may be performed after other blocks within method 1200 without departing from the scope hereof. In embodiments that optionally include block 1214, instead of working with single words to construct the vocabulary in a Bag-of-word model, N-grams are phrases constructed with consecutive N words in the source text. Each of the N-gram can then be considered a term in the text retrieval and analysis.

In block 1216, a Term Frequency Inverse Document Frequency (TF-IDF) Matrix is generated from the remaining complied data 204. In one example of block 1216, the data ingestion module 112 analyzes the remaining complied data 204 after block 1214 and generates a TF-IDF Matrix. TF-IDF Matrix generation may be performed after other blocks within method 1200 without departing from the scope hereof. The TF-IDF scoring algorithm considers frequency of the terms appearing in a document, and at the same time put more weight on those terms that occur less frequently across documents in the text corpus. The term frequency, $tf_{t,d}$ describes how frequent the term t is in a given document d, and is expressed as log normalized as Log(1+$tf_{t,d}$). On the other hand, df refers to document frequency and relates to the number of document that contains the search keyword. The inverse document frequency (idf) describes the relevance of the search term in relation to all the documents in the collection, as depicted in the following equation:

$$idf_t = \log \frac{N}{df_t} \qquad \text{Equation (1)}$$

where N is the total number of documents in the text corpus. The (tf–idf) is therefore defined as:

$$tfidf = \log(1 + tf_{t,d}) \log \frac{N}{df_t} \qquad \text{Equation (2)}$$

The processed submission 206 may then be analyzed by micro-credential predictive module 118 via classification of the processed submission 206 by the predictive model 120. In one example, the predictive model 120 is based on one or more of a Pachinko Allocation Model (PAM), a Latent Dirichlet Allocation (LDA) Model, and a MLkNN model.

Topic modeling discovers the thematic structure of a given text corpus. It models the relationships between the vocabulary of the corpus and the documents through the thematic structure. Topic models gained popularity in recent years as the learned structure and relationships can be used for the analysis of large-scale natural language text data, including query, discover trends, language translation, document classification, information retrieval, text summarization, sentiment analysis and various data mining problems. Given a corpus of text documents, parameter estimation in these topic models extracts a lower dimensional set of multinomial, i.e., multi-label word distributions called topics. Mixtures of the topics provide high probability to the training data, and the highest probability words in each topic provide the keywords that briefly summarize the themes in the text corpus (e.g., the processed submission 206).

The topic modeling problem can be attempted as a multi-label classification problem, where each document may belong to several pre-defined topics simultaneously. The problem can be formally defined here. Let X denote the domain of documents and let $Y=\{1, 2, \ldots, Q\}$, be the finite set of topics, i.e., the labels. Given a training set, $T=\{(x_i, Y_i)\}_{i=1}^m$, where $x_i \in X$, $Y_i \in$ drawn from an unknown distribution D, the objective is to generate a multi-label classifier, h: $X \rightarrow 2^Y$, which optimizes some specific evaluation metric. Instead of providing only the input to output label mapping, the learning algorithm will produce a real-valued function of the form, $f: X \times Y \rightarrow \mathbb{R}$. It is assumed that, given a document, $x_i$, and its associated topic label set, $Y_i$, a successful learning system is going to return larger values for labels in $Y_i$ than those not in $Y_i$, i.e., $f(x_i, y_1) > f(x_i, y_2)$, for any $y_1 \in Y_i$ and $y_1 \notin Y_i$.

Figure 13:
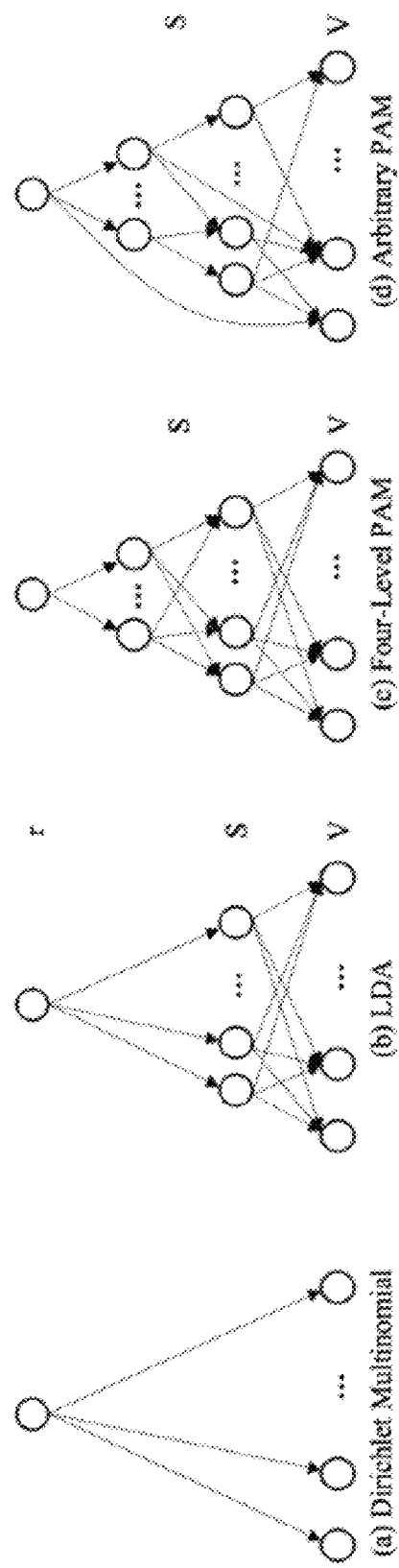
FIG. 13 illustrates PAM structure in contrast with LDA and multinomial Dirichlet models.

FIG. 13 illustrates the PAM structure in contrast with LDA and multinomial Dirichlet models. In FIG. 13, the four topic model structures include: (a) Dirichlet multinomial: for each document, a multinomial distribution over words is sampled from a single Dirichlet distribution. (b) LDA: it samples a multinomial over topics for each document, and then generates words from the topics. (c) a 4-level PAM: it contains a root, a set of super-topics, a set of sub-topics and a word vocabulary. Both the root and the super-topics are associated with Dirichlet distributions, from which multinomials over their children for each document are sampled. (d) PAM: an arbitrary directed acyclic graph (DAG) structure encoding the topic correlations. Each interior node is considered a topic and associated with a Dirichlet distribution The LDA2vec model learns dense word vectors jointly with Dirichlet distributed latent document-level mixtures of topic vectors (Christopher E Moody. 2016. Mixing dirichlet topic models and word embeddings to make lda2vec.arXiv preprint arXiv:1605.02019.). In one embodiment, the predictive model 120 used by micro-credential predictive module 118 is based on Pachinko Allocation Model instead of the LDA as the algorithm improves upon LDA based approaches by modeling correlations between topics in addition to the word correlations which constitute topics. PAM may be advantageous, in certain embodiments, as it provides more flexibility and greater expressive power than Latent Dirichlet allocation.

In one embodiment, the predictive model 120 used by the micro-credential predictive module 118 is trained based on a Pam2vec algorithm. In this model, the total loss term, L is the sum of the Skipgram Negative Sampling Loss (SGNS), $L_{ij}^{neg}$ with the addition of a Pachinko-likelihood term over document weights, $L^d$. The loss is conducted using a context vector, $\vec{c_j}$, pivot word vector, $\vec{w_j}$, target word vector $w_i$, and negatively-sampled word vector $w_l$. Pairs of pivot and target words (j, i) are extracted when they co-occur in a moving window scanning across the corpus (e.g., processed submission 206). For every pivot-target pair of words the pivot word is used to predict the nearby target word. Each word is represented with a fixed-length dense distributed-representation vector. The same word vectors are used in both the pivot and target representations. Both words and document vectors are then embedded into the same space and the predictive model 120 is trained based on both representations simultaneously. By adding the pivot and document vectors together, both spaces are effectively joined.

Figure 14:
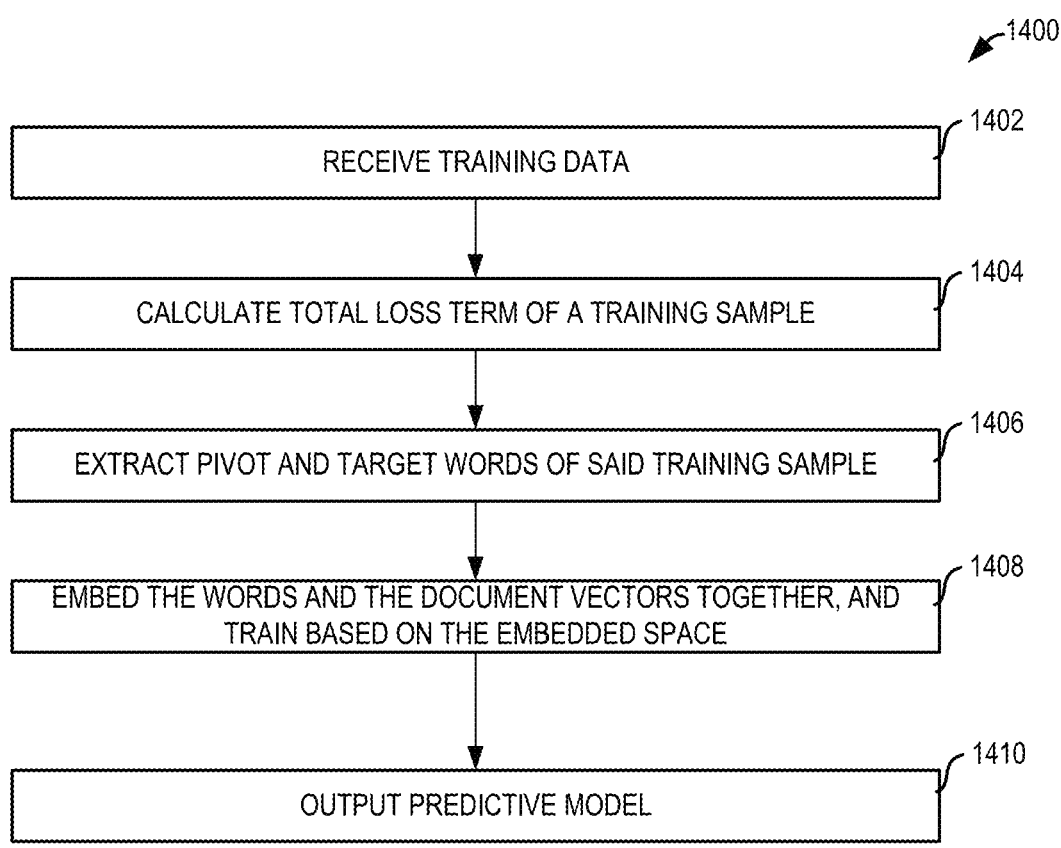
FIG. 14 shows a method for training the predictive model of FIG. 1, in embodiments.

FIG. 14 shows a method 1400 for training the predictive model 120 of FIG. 1, in embodiments. Method 1400 is implemented by accreditation portal 102, such as via a micro-credential predictive module 118, in an embodiment.

In block 1402, method 1400 receives training data. Training data may be a plurality of the received processed submissions 206, or may be created ones thereof that are associated with appropriate micro-credentials.

In block 1404, method 1400 calculates a total loss term of the training sample received in block 1402. In one example of block 1404, micro-credential predictive module 118 calculates the total loss term, L, as the sum of the Skipgram Negative Sampling Loss (SGNS), $L_{ij}^{neg}$ with the addition of a Pachinko-likelihood term over document weights, $L^d$. The loss is conducted using a context vector, $\vec{c_j}$, pivot word vector, $\vec{w_j}$, target word vector $w_i$, and negatively-sampled word vector $w_l$.

In block 1406, the method 1400 extracts pivot and target words of said training sample, and represents them with a fixed-length dense vectors. In one example of block 1404, micro-credential predictive module 118 extracts pairs of pivot and target words (j, i) when they co-occur in a moving window scanning across the corpus (e.g., said given sample processed submission 206). For every pivot-target pair of words the pivot word is used to predict the nearby target word. Each word is represented with a fixed-length dense distributed-representation vector.

In block 1408, the method 1400 embeds the extracted words and vectors together in a single embedded space, and trains a predictive model using the embedded space.

In block 1410, the method 1400 outputs the trained predictive model. In one example of block 1410, micro-credential predictive module 118 outputs predictive model 120 of FIG. 1.

As discussed above, the trained predictive model 120 is used to characterize one or more micro-credentials 122 to a submission received from applicant 104. The predictive model 120 may be based on a single predictive algorithm (e.g., the Pam2vec algorithm discussed above with respect to FIG. 14), or a plurality of predictive algorithms.

Figure 15:
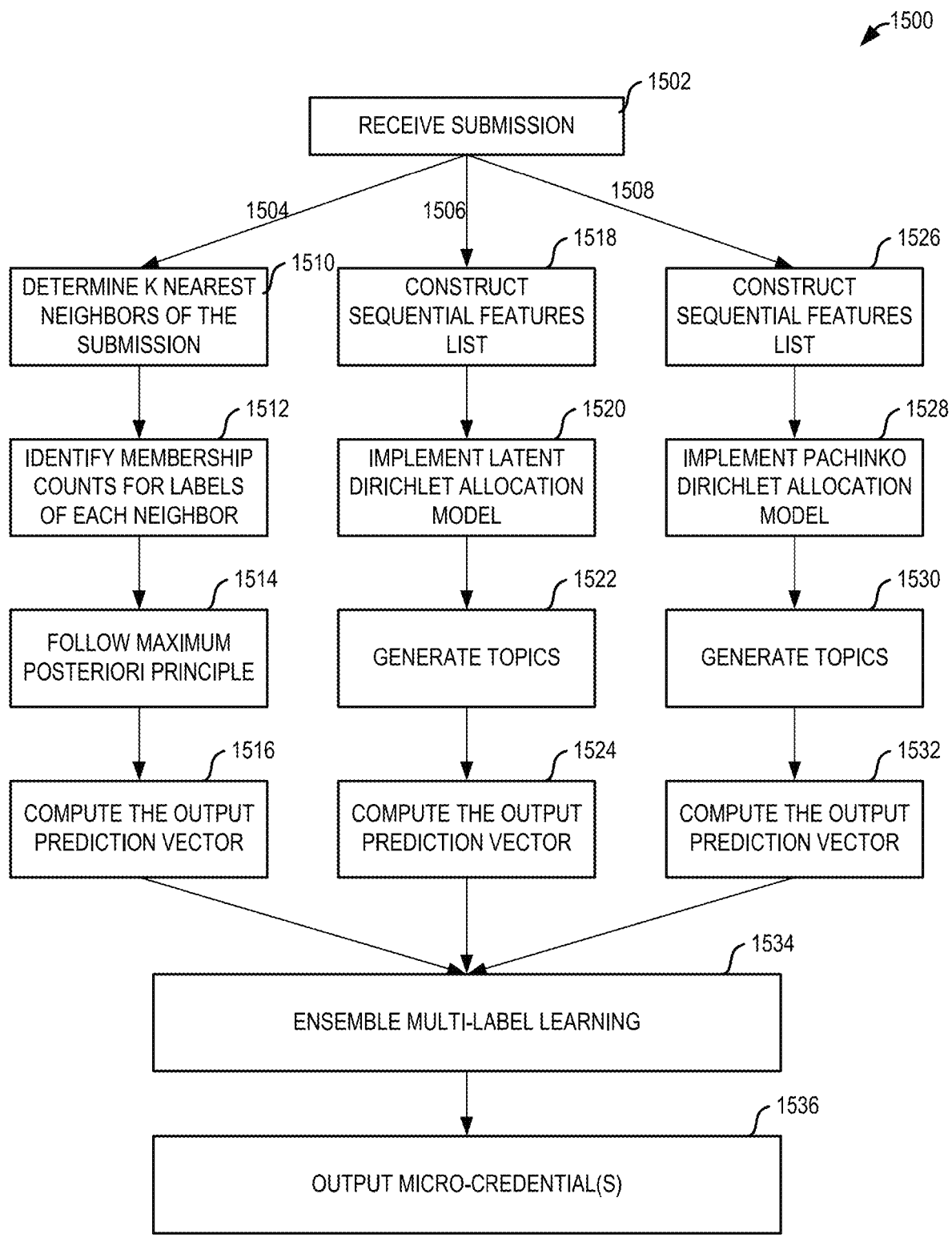
FIG. 15 shows a method for classifying a submission to output one or more micro-credentials, in an embodiment.

FIG. 15 shows a method 1500 for classifying a submission (e.g., processed submission 206) to output one or more micro-credentials (e.g., micro-credentials 122 of FIG. 1), in an embodiment.

In block 1502, the method 1500 receives a submission for analysis. In one example of block 1502, the micro-credential predictive module 118 receives the processed submission 206 from the data ingestion module 116.

Method 1500 then implements one or more of branches 1504, 1506, and 1508.

Branch 1504 implements a ML-kNN predictive model (which is an example of predictive model 120). ML-kNN is an effective realization of the multilabel classification algorithm (Min-Ling Zhang and Zhi-Hua Zhou. 2007. Ml-knn: A lazy learning approach to multi-label learning. Pattern recognition, 40(7):2038-2048, which is incorporated herein by reference.). For each unseen document instance, its k nearest neighbors in the training set are first identified (blcok 1510). Subsequently, based on assessment of information gained from the predicted label sets of these neighboring instances, i.e., the number of neighboring instances (block 1512) belonging to each possible class, maximum a posteriori (MAP) principle is employed (block 1514) to determine the label set for the unseen instance (block 1516).

Branch 1506 implements a latent dirichlet allocation predictive model (which is an example of predictive model 120). Latent Dirichlet Allocation (LDA) is a topic model applied mostly to generate texts based on topic of choice (David M Blei, Andrew Y Ng, and Michael I Jordan. 2003. Latent dirichlet allocation. Journal of machine Learning research, 3(January):993-1022; which is incorporated by reference herein.). It also can be employed in the text categorization problems. The received submission is split into a plurality of sequential features (block 1518). LDA is then implemented (block 1520) which represents each document as a mixture of topics, where each topic is a multinomial distribution over words with respect to a vocabulary. To generate a document, the method 1500 LDA first samples a per-document multinomial distribution over topics from a Dirichlet distribution. Then it repeatedly samples a topic from this multinomial and samples a word from the topic. Topics extracted (block 1522) by LDA capture correlations among words. An output prediction vector of the given topic to a set of potential micro-credentials is calculated (block 1524) for each generated topic, and those satisfying a threshold value are indicated as appropriate micro-credentials.

Branch 1508 implements a pachinko dirichlet allocation predictive model (which is an example of predictive model 120). The Pachinko Allocation Model (PAM) utilizes a multi-level directed acyclic graph (DAG) structure to model the topic correlations and hierarchies, where the leaf nodes represent the words, and the nodes in the inner levels represent topics (Wei Li and Andrew McCallum. 2006. Pachinko allocation: Dag-structured mixture models of topic correlations. In Proceedings of the 23rd international conference on Machine learning, pages 577-584; which is incorporated by reference herein). The received submission is split into a plurality of sequential features (block 1526). Then, to implement PDA model (block 1528), topics are considered distribution over words in the vocabulary. It samples a topic path for each word to identify the topic associations. The model is trained with Gibbs sampling method. Topics extracted (block 1530) by PAM capture correlations among words. An output prediction vector of the given topic to a set of potential micro-credentials is calculated (block 1532) for each generated topic, and those satisfying a threshold value are indicated as appropriate micro-credentials.

Although only three branches (branches 1504, 1506, and 1508) are shown, there may be more or fewer branches without departing from the scope hereof. Moreover, different predictive models may be used other than those shown. For example, other types of applicable predictive models include, but are not limited to, logistic regression, support vector machines, and Naïve Bayes. As an example, there may be a set number of target (potential) micro-credentials 124 (e.g., 152 potential assignable micro-credentials). Further, the potential assignable micro-credentials may be separated into a hierarchy (e.g., three levels: level 1, level 2, and level 3). Each target micro-credential 124 may be associated with a target classifier 126 (which may be any one or more of the branches discussed in method 1500). Certain target micro-credentials 124 may be available only depending on specific responses to the prompts discussed in FIGS. 3-11. If applicant says they would not do anything differently in response to the "moving forward" prompt shown in FIG. 7, a "reflection" micro-credential may not be available. In one embodiment, an individual binary classifier may be fit to each micro-credential target (e.g., using logistic regression, per target). These binary classifiers may then be used (in addition to or in alternative to branches 1504, 1506, and 1508) to classify micro-credentials to a received submission.

Referring back to FIG. 15, in block 1534, method 1500 applies ensemble multi-label learning. In one example, multiple different learning algorithms must come to a consensus on target potential micro-credentials associated with the received submission by each branch. In another example, the associated prediction vectors must reach a desired threshold. Each of the three branches (1504, 1506, 1508) may be separate multi-label (i.e., multi-output) classifiers that independently predicts the micro-credentials for a given submission (1516, 1524, 1532). The ensemble multi-label learner (1534) receives the predictions from the three branches and combines the predictions, through one or both of Boosting and stacked generalization and generates the final consensus prediction of micro-credentials.

In block 1536, the target potential micro-credentials that are collectively agreed upon in block 1534 (or those output by one or more branches if block 1534 is not included) are output as assigned micro-credentials (e.g., micro-credentials 122) and associated with the received submission. Block 1536 may include identifying a plurality of the assigned micro-credentials 122 that collectively qualify the applicant 104 for one or more accreditation credits 123 based on configuration settings defined by accreditor 106 interaction with accreditor device 110(2). Block 1536 may include transmitting an API call to display one or more of the assigned micro-credentials 122 and associated accreditation credits 123 on the applicant device 110(1) and/or accreditor device 110(2).

Model Maintenance:

Machine learning models are inherently sensitive to the distribution of the training dataset. The population data distribution may change after the model is built on a subset obtained at a specific timestamp in the past. If it happens, the model will suffer consequences like increasing in the misclassification rate, losing reliability. Therefore, post-training model maintenance and calibration is a necessary step which needs to be scheduled on a regular basis.

The following illustrates how annotated data (e.g., training data used to create and/or update the prediction model 120) impacts correctness, and possibly inherent biases implemented by the prediction model 120. To create initial training data to train the prediction model 120 for use, a training phase was initiated that focused on creating a process for establishing interrater reliability (IRR) using the educational research literature. The IRR process included the following steps: 1) training a diverse group of data taggers as qualitative data labelers/coders using the accreditation platform 102; and 2) using accreditation platform 102 driven a priori labels/codes to analyze submitted narratives (e.g., submissions 202). This training phase methodology led to outlining the procedure to establish IRR using a priori codes. The coded data will then be used to develop a second phase methodology in which a machine learning algorithm will be created.

According to Walter et al.'s 1998 power calculations for interrater reliability, a minimum of 2 raters are needed for 43 pieces of information to have enough power to find Interclass Correlation Coefficient (ICC) agreement above 0.70. Since we wanted to compare pre and post, 4 raters instead of only 2 ensures more power for comparisons (i.e. 2 raters×2 attempts) and the same rationale was used as we wanted to compare 3 frameworks (2 raters×3 frameworks). Therefore 6 raters are recommended for coding. Additionally, if we wanted to conduct t tests by pre-post or by "correct" answer for each code, a power analysis using G*Power software shows that 42-45 items are needed. As we expect a few problematic observations, 45 items/observations are recommended.

TABLE 1

Pre and post coding results

| | Pre-Training | Post-Training |
|---|---|---|
| Considering the Items | | |
| Average Correct Answers | 59% | 83% |
| Average Agreement (not necessarily correct) | 59% | 70% |
| Number of Items Matched Correct & Agreement percentages | 21 (47%) | 22 (50%) |
| ICC for the Measure | 0.46 | 0.83 |
| Considering the Coders | | |
| Coder 1 Correctness | 53% | 80% |
| Coder 2 Correctness | 56% | 81% |
| Coder 3 Correctness | 58% | 77% |
| Coder 4 Correctness | 64% | 89% |
| Coder 5 Correctness | 67% | 84% |
| Coder 6 Correctness | 53% | 82% |

We then ran statistical analysis to measure Intraclass Correlation at 95% confidence interval and share the results in Table 2:

TABLE 2

Average total agreement = 80%
Intraclass Correlation Coefficient

| | | 95% Confidence Interval | | F Test with True Value 0 | | | |
|---|---|---|---|---|---|---|---|
| | Intraclass Correlation[b] | Lower Bound | Upper Bound | Value | df1 | df2 | Sig |
| Single Measures | .477[a] | .397 | .561 | 6.462 | 119 | 595 | .000 |
| Average Measures | .845[c] | .798 | .884 | 6.462 | 119 | 595 | .000 |

Table 2 establishes that two-way mixed effects model where people effects are random and measures effects are fixed. It is assumed that the estimator is the same, whether the integration effect is present or not. Type C intraclass correlation coefficients using a consistency definition. The between-measure variance is excluded from the denominator variance. The estimate is computed assuming the interaction effect is absent, because it is not capable of estimation otherwise. The calculation shown in table 2 provides for a high confidence in data coding, which is then used to code a larger set of data for preparing the prediction model 120.

One simple solution, where the prediction model is biased due to poor data labeling during training would be to retrain the model with the new training dataset when available. But, the approach may become time consuming and model still may suffer the aforementioned issues during the retraining interval. The second approach, is to apply incremental update on the model parameters after each new training sample whenever pushed from the platform.

Figure 16:
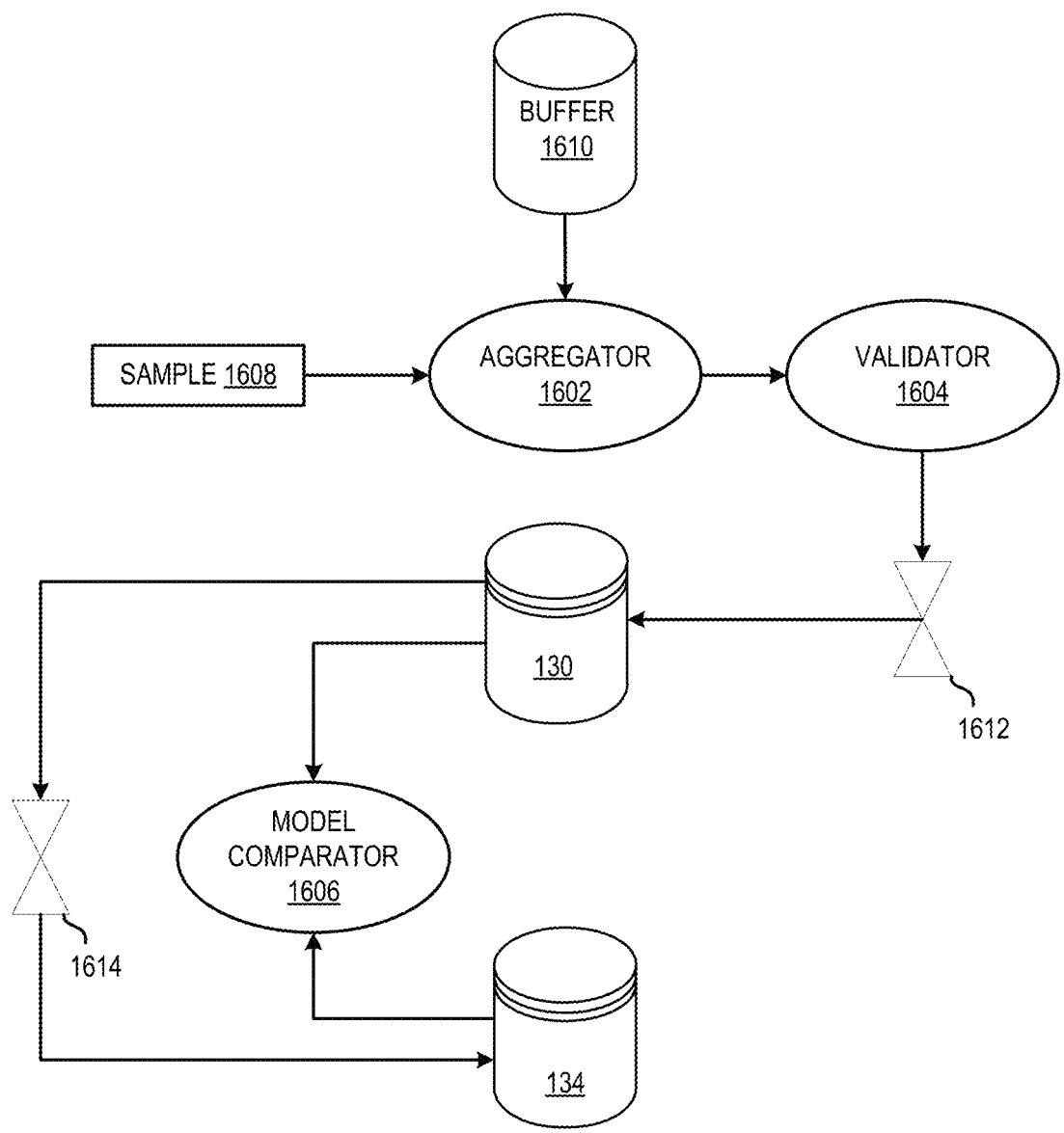
FIG. 16 illustrates a functional block diagram of a model calibration method to maintain a prediction model for micro-credential accreditation, in embodiments.

FIG. 16 illustrates a functional block diagram of a model calibration method 1600 with a flow diagram which depicts all the modules necessary to maintain the model (e.g., predictive model 120) deployed in production. Method 1600 is implemented using the model maintenance module 128, for example. The method 1600 implements of three components: i) Aggregator 1602, ii) Validator 1604, and iii) Model comparator 1606.

A new sample 1608 is received and stored within a buffer 1610 of size m samples. Method 1600 then re-computes the statistics of the m samples including the new sample 1608. It reports to the validator 1604 when the buffer 1610 is full. The pipeline utilizes an adaptive algorithm to change the size of buffer 1610 in each run based on the variance observed in the statistics.

The validator 1604 employs an ensemble machine learning approach to detect if any of the new samples 1608 present in the buffer 1610 is an outlier. If an outlier is present, it re-assesses the statistics calculated by the aggregator module 1602 and then triggers the incremental model parameter update (block 1612) on a model clone 130. The updates do not affect the model being used in the production environment (e.g., predictive model 120). Incremental update steps vary significantly by model types, model complexity and difference between the previous and new statistics. The validator module 1604, therefore, needs to account for successfully deciphering and understanding the general trends of the data and semantics of the population statistics. Method 1600 utilizes multifarious techniques involving machine common sense reasoning, rare event modeling and model selection from an ensemble to address the changes.

The model comparator 1606 then performs an evaluation (block 1614) using a pre-determined validation data to compare model performances of the production environment (e.g., predictive model 120) and the newly updated model clone 134. If the predictive performance of the updated model clone 134 is satisfactory, it triggers a backup and deploy event to replace the production environment model (e.g., predictive model 120) in production with a model update 132.

Ethical Awareness Calibration

Model maintenance module 128 may further analyze the outputs of the models and verify that the models are performing in an ethical manner. The purpose of the embodiments of the systems and methods described herein is to improve outcomes for minoritized students, but unintentional and unwanted bias may occur in machine learning framework. Model maintenance module 128 may compensate for this unintentional and unwanted bias by monitoring the output and verifying it is performing appropriately.

Machine learning models (e.g., predictive models 120) may be inherently biased if the data to which they are trained on has said inherent bias (see my comment above). The training data is annotated using human annotators, and thus the annotators shape the data used by the model. Model maintenance module 128 may analyze the output of the models 120 and provide valuable feedback to our human annotators. This feedback provides annotators the opportunity to reconsider their own inherent biases and to account for the way the models leverage their annotations. The only way to achieve ethical results in use cases such as these is to view the entire process iteratively—from end to end. The annotators do not simply decide on annotations once and for all. Rather, they are privy to the sorts of mistakes the machine learning model makes from their annotations in order to consider possible biases in their own annotation work. They consider how to address the root (rather than superficial) of the unwanted bias (Corbett-Davies, S. and Goel, S. (2018). The measure and mis-measure of fairness: A critical review of fair machine learning. CoRR, abs/1808.00023.; Fazelpour, S. and Lipton, Z. C. (2020). Algorithmic fairness from a non-ideal perspective. AIES '20, 219 page 57-63, New York, N.Y., USA. Association for Computing Machinery.; Estrada, D. (2020). Ideal theory in AI ethics. *CoRR*, abs/2011.02279.).

The alternative is to ensure that the unfairness generated by an algorithm on particular annotations is distributed equally among all groups. This does not usually improve the situation much because it fails to account for and address the characteristics of the data that are leading to the unwanted bias in the first place. Further, such superficial alternative approaches fail to provide guidance on how the machine learning fueled platform like the systems and methods described herein should address the root cause of the unwanted biases. To address these inherent bias problems, the model maintenance module 128 may implement a machine-in-the-loop strategy to understand the intersection of machine and human bias for an effective and fair micro-credentialing process.

Referring back to FIG. 1, the model maintenance module 128 may analyze the output micro-credentials 122 to calculate a fairness metric 134. In one embodiment, the fairness metric 134 is based on conditional statistical parity (CSP). CSP measures whether particular groups of applicants 104 have equal probability of receiving a favorable outcome (in this case a credential 122) while permitting a legitimate factor to affect the prediction fairly. The applicant pool considered for the fairness metric may have required thresholds, such as number of submitted experiences. In one embodiment, submissions from applicants 104 who have not submitted at least 5 submissions are not considered for the fairness metric 134 because applicants 104 who have submitted fewer than 5 experiences to be too inexperienced and exclude them from consideration.

Thus, to calculate the fairness metric 134, the model maintenance module 128 may identify a CSP value 136 of each target micro-credential 124. The CSP value 136 is calculated by determining the probability of said target micro-credential 124 being issued to a certain demographic group of applicants 104.

As discussed above, the micro-credentials 122 may be divided into a hierarchy of levels. In testing of the present embodiments herein, for level-1 and level-2 credentials, CSP was found for many—but not all—credentials. We found that CSP exists for most credentials between most groups, but occasionally a group achieves substantially fewer credentials than other groups. For example, the applicants 104 who identified as white achieved a CSP of 0.1049 for the "working with others" credential, whereas students who identify as black or African American achieved a CSP of 0.0368 (see 2). If the data annotations are taken to be authoritative (and not unintentionally inherently biased), students who identify as black or African American would necessarily be somehow deficient (perhaps due to systemic discouragement of these experiences). A second possibility also exists, however. Students who identify as black or African American may express how they work with others in ways that are different from white students and in ways that the annotators might have missed. These questions cannot be answered by the outputs of the model alone. They need to be answered by the subject experts (in this case, the annotators).

Accordingly, when the CSP value 136 for a first demographic of applicants 104 for a given target micro-credential 124 differs from a second demographic of applicants 104 for said given target micro-credential 124 greater than or equal to a CSP threshold value 138, the model maintenance module 128 may trigger a model update 132. In one embodiment, the CSP threshold value 138 is equal to or greater than 0.05 as credentials of concern.

Example 1: Unassigned Micro-Credentials

The following example shows a processed submission (e.g., processed submission 206) that was not assigned at least 5 micro-credentials by human annotators (e.g., 5 of the target micro-credential 124 were not included as a micro-credential 122 when human annotators assigned micro-credentials, and thus would not be used to train the predictive model 120). The submission text was as follows: "So, I have been working on this project for some time and the challenge I am facing is to balance various responsibilities—I have to manage multiple roles and various tasks. I have been feeling very stressed out and feeling the need to take a break. I reached out to some family and friends and have a conversation and found a way to destress. I learnt that there are ups and down in this process and one should keep the bigger picture in mind and not let bad news get me down. I would not allow myself to go down this path for too long and seek some interventions earlier."

In example 1, the machine learning model (e.g., predictive model 120) predicted the following level-3 codes that the human coders missed during annotations. The predictions were later marked approved after review of by annotators (e.g., administrator 108) and being included as new training data to generate model update 132.

Recognize one's emotions, thoughts, behaviors, and/or body sensations.
Uses strategy to regulate cognitive, behavioral, and/or emotional states in the moment (e.g., reaching out to someone, breathing, etc.)
1.2.3 Enacts Self and/or others advocacy
1.4.2 Observes situations carefully
6.5.2 Reflects on next steps, or what they could have done differently based on the submitted experience.

Example 2: Unassigned Micro-Credentials

The following example shows a processed submission (e.g., processed submission 206) that was not assigned at least 6 micro-credentials by human annotators (e.g., 6 of the target micro-credential 124 were not included as a micro-credential 122 when human annotators assigned micro-credentials, and thus would not be used to train the predictive model 120). The submission text was as follows: "I worked with my sister to resolve a family conflict related to my mothers health. She did not do her part and that led to my mother's deteriorating health. I learnt that I can not trust and rely on my sister. I would have found other people to take care of my mom's health and manage the situation. I will identify 2-3 resource people and keep in touch with them to make sure that this doesn't happen again."

In example 2, the machine learning model (e.g., predictive model 120) predicted the following level-3 codes that the human coders missed during annotations. The predictions were later marked approved after review by annotators (e.g., administrator 108) and are being included as new training data to generate model update 132.

1.1.1 Recognize one's emotions, thoughts, behaviors, and/or body sensations
1.4.2 Observes situations carefully
6.4.3 Implements problem solving strategies
6.5.3 Engages in Reflection (Code this micro if the student: 1) Demonstrates that their experience included a reflective process; 2) If student describes some kind of emotional/reflective thinking response that came out of their experience
1.2.2 Recognize one's shortcomings to overcome obstacles or improve skills (e.g., I used to do X, but not doing that anymore because it didn't serve)
5.5.3 Supports personal mental health Example 3: Model Comparison In example 3, three models were trained for predicting level-3 micro-credentials: Logistic Regression, Naïve Bayes and Support Vector Machines with linear kernel on a 5000 dimensional "term frequency inverse document frequency" scores of the experience text corpus that were received from applicants 104. A 10-fold cross-validation was conducted for each of the models, and the evaluation results are presented in Table 3, below. Each of the three classifiers show promising prediction performance where Logistic Regression based multi-output classification demonstrated slightly faster performance than the rest on an average.

TABLE 3

Experimental evaluation of three Bag-of-Word Models in terms of average accuracy of each of predictions of 152 level-3 microcredential classes, and CPU time required for micro-credential assignment of each experience text submitted.

| Model Name | Average Accuracy | Average Prediction Time per Submission |
|---|---|---|
| Logistic Regression | 0.96 ± 0.066 | 0.089959 |
| Support Vector Machines | 0.96 ± 0.006 | 0.093059 |
| Naïve Bayes | 0.94 ± 0.005 | 0.109604 |

Example 4: Unintentional Bias

A sample of output micro-credentials 122 were evaluated. When the possible race categories were isolated to "white" and "black or African American" for the sake of illustration, 12.8% of the level-2 micro-credentials have a difference in CSP greater than or equal to 0.05. 60% of these differences favored white submissions. The annotators assessed these differences looking especially for initial annotations that might contain some annotator bias. For instance, Table 4 outlines effectiveness of model refinement through the proposed iterative pipeline on a particular level-2 micro-credential, "Working with Others".

TABLE 4

Conditional statistical parity for the "Working with Others" credential by race, before and after annotation re-assessment. (Results for other credentials will be included later for presentation.)

| Iteration | White | African American |
|---|---|---|
| Before Annotation Reassessment | 0.1049 | 0.0368 |
| After Annotation Reassessment | 0.1049 | 0.0743 |

After one iteration of training the model, the output micro-credentials 122 were sent back to annotators 108 and asked them to reconsider the annotations for credentials exhibiting a difference in CSP value 136 greater than or equal to 0.05 (e.g., CSP threshold 138) between two demographic groups. This reconsideration was performed one demographic group at a time, so that the annotators 108 could consider possible systemic bias as explanations. For example, the annotators discovered that black or African American students in the sample tend to talk about working with others passively, whereas white students tend to describe working with others actively.

Figure 17:
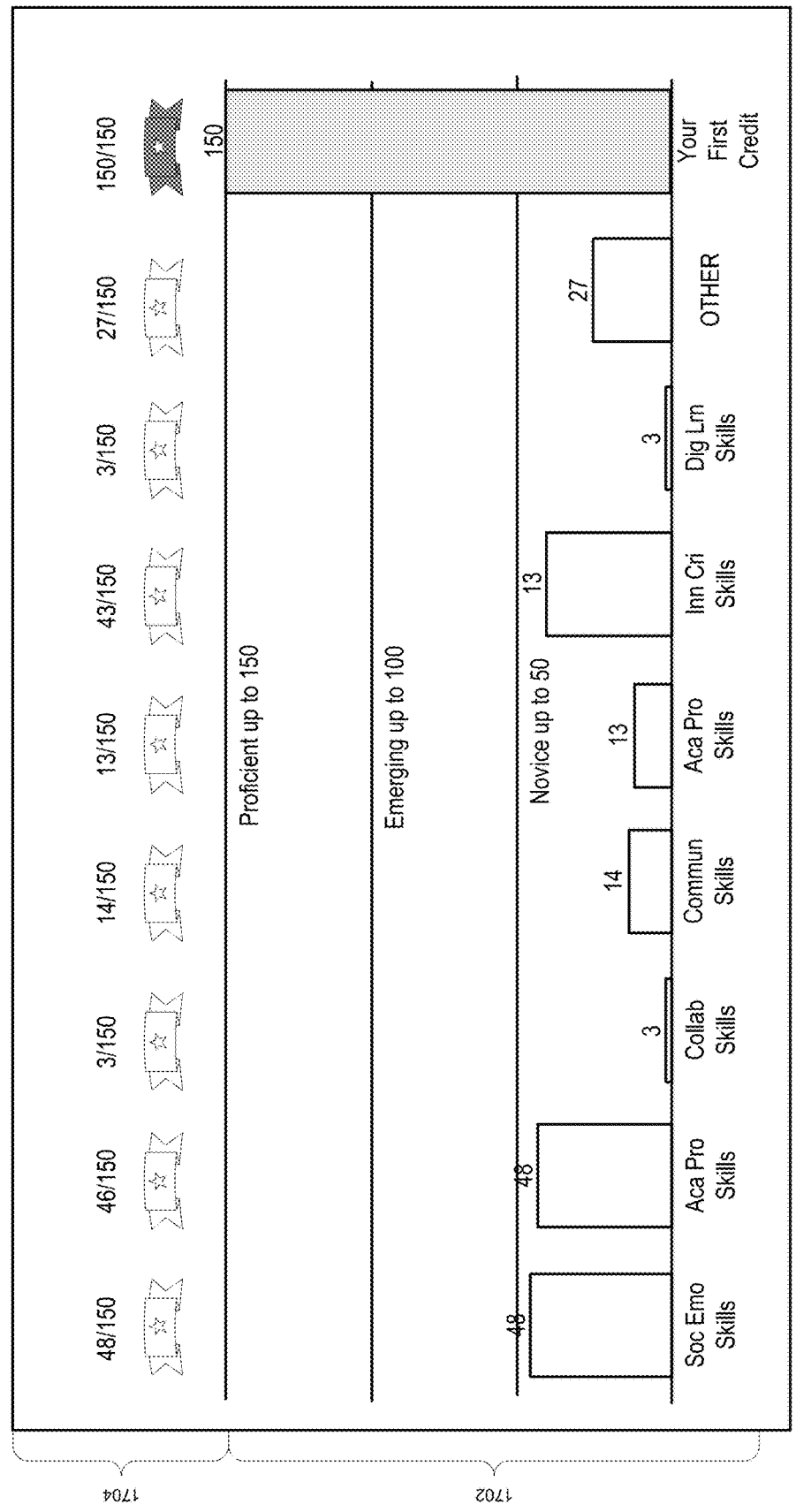
FIG. 17 shows an example micro-credential display, in embodiments.

Referring to FIG. 1, accreditation portal 140 may further include a display module 140. Display module 140 interacts with applicant device 110(1), accreditor device 110(2), and administrator device 110(3) to display information via one or more API calls/requests with the hosted URL browser on the given computing device 110. FIG. 17 depicts a screenshot 1700 implemented by display module 140 showing a plurality if micro-credentials 122 gained 1702 and remaining needed 1704 to achieve an accreditation credit 123, in an embodiment.

Figure 18:
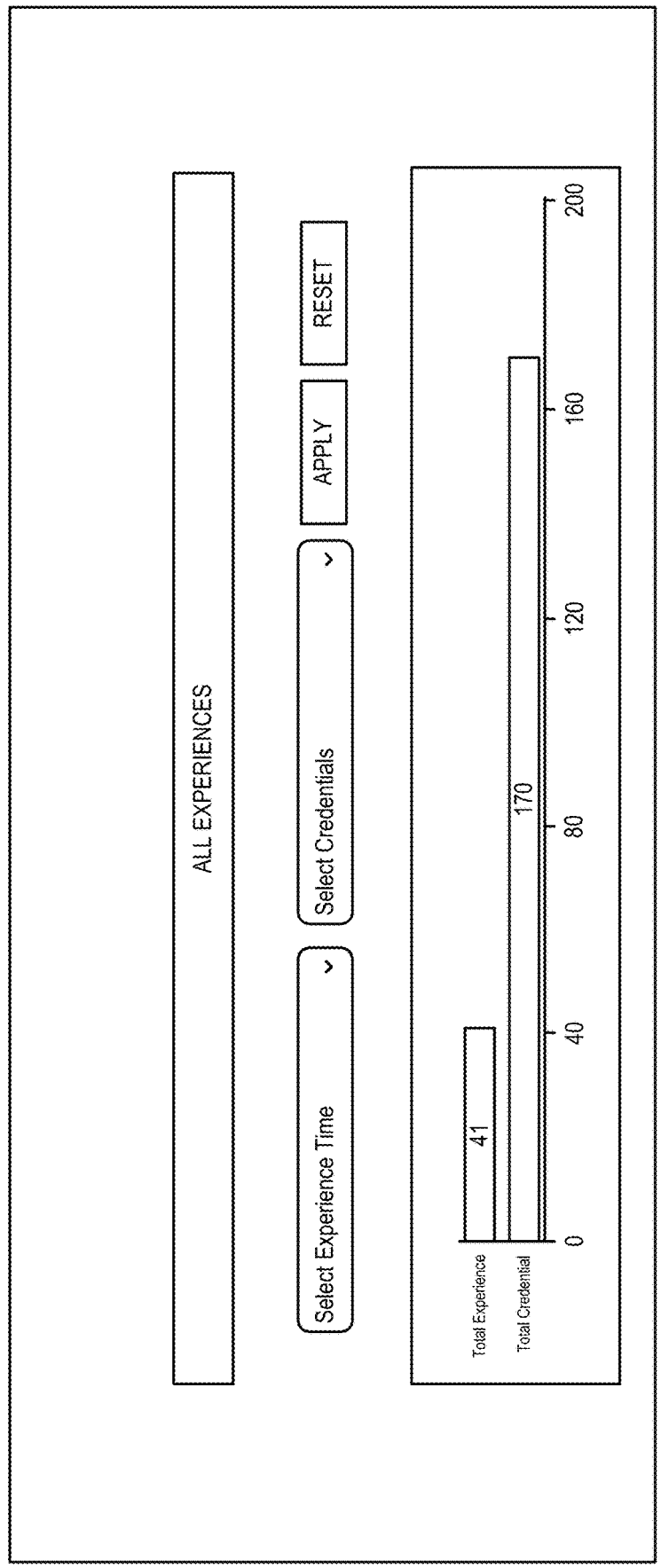
Figure 19:
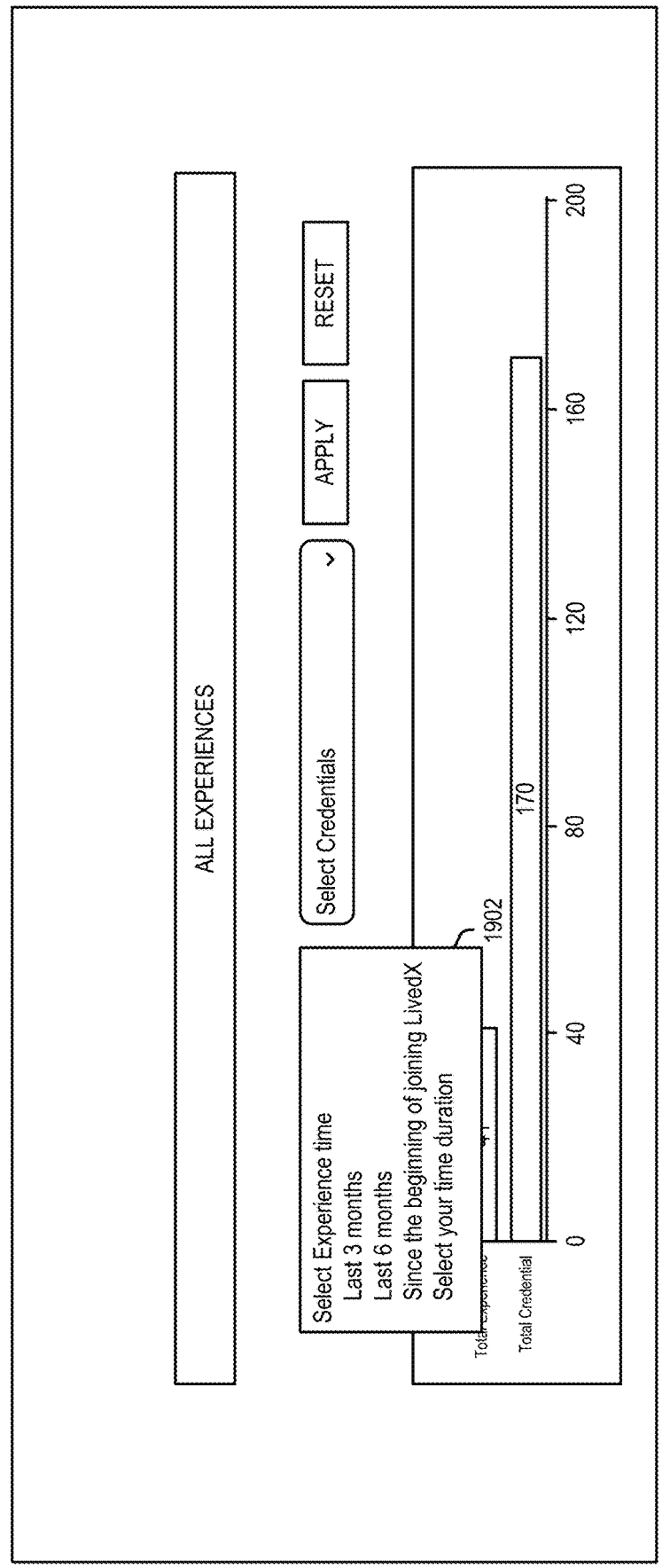

Display module 140 further includes various filters that are accessible by applicant 104, accreditor 106, and administrator 108, via interaction with their respective computing device 110. FIGS. 18-19, for example, show a screenshot 1800 and 1900, respectively allowing a user to filter for experiences submitted (e.g., submissions 202, 204, or 206) within a selectable period 1902. FIG. 20 shows a screenshot 2000 of displayed and selectable experiences submitted after selection of one of the selectable periods 1802, of FIGS. 18-19, in an embodiment. FIG. 21 shows a screenshot 2100 displayed in response to user-selection of one of the displayed and selectable experiences shown in FIG. 20, in an embodiment.

It should be appreciated that, although FIGS. 18-21 show displays associated with the applicant device 110(1), similar displays may be configured by the display module 140 for each of the accreditor device 110(2) and administrator device 110(3) to display and interact with each of the accreditor 106 and administrator 108. For example, the accreditor device 110(2) may display an interactive display interactable by the accreditor 106 to receive configuration settings such as number of micro-credentials 122 required to achieve a given accreditation credit 123, and which accreditation credits 123 are available to given applicants 104.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for micro-credential accreditation, comprising:
   receiving a text submission from an applicant device describing an event the applicant experienced, the text submission including (a) a selected response to one or more selectable prompts and (b) input text;
   generating a compiled submission, the compiled submission including a text string, a first portion of the text string corresponding to the selected response and a second portion of the text string including the input text;
   processing the compiled submission with a predictive model to fit at least one micro-credential to the compiled submission, the micro-credential at least partially qualifying the applicant for credit from an accreditor, the processing the compiled submission including applying the compiled submission to a plurality of different prediction models each generating a list of fit micro-credentials, and implementing a consensus algorithm to develop a subset list of one or more micro-credential from each list of fit micro-credentials;
   outputting the at least one micro-credential from the subset list.

2. The method of claim 1, wherein outputting the at least one micro-credential includes providing school credit to the applicant.

3. The method of claim 1, wherein outputting the at least one micro-credential includes displaying, on the applicant device, a chart indicating required micro-credentials to receive an accreditation credit.

4. The method of claim 1, the receiving a text submission comprising providing one or more prompts to the applicant device, and receiving responses to said one or more prompts from the applicant device.

5. The method of claim 4, the prompts including the one or more selectable prompts including a plurality of selectable options, and Tillable prompts including an input box for receiving text input.

6. The method of claim 1, wherein generating the compiled submission further comprises generating a processed submission by:
   removing gibberish text within the text submission;
   standardizing text within the text submission;
   removing white space within the text submission;
   removing stop-words within the text submission;
   stemming individual words or phrases within the text submission; and,
   performing lemmatization on the words or phrases within the text submission;
   wherein said processing the compiled submission includes processing the processed submission.

7. The method of claim 1, wherein generating the compiled submission further comprises generating a processed submission by identifying a term frequency inverse document frequency (TD-IDF) matrix from the received text submission; wherein said processing the compiled submission includes processing the TD-IDF matrix.

8. The method of claim 1, the processing the compiled submission comprising applying the text submission, or a processed version thereof, to a Pachinko Allocation Model to fit the at least one micro-credential.

9. The method of claim 1, the processing the compiled submission comprising applying the text submission, or a processed version thereof, to a plurality of different prediction models each generating a list of fit micro-credentials, and implementing a consensus algorithm to develop a final list of one or more micro-credential from each least of fit micro-credentials.

10. The method of claim 9, the consensus algorithm including one or both of Boosting and stacked generalization.

11. The method of claim 1, further comprising monitoring previously output micro-credentials by demographic groups of applicants to identify whether the predictive model consistent between each demographic group; and updating the predictive model when the predictive model is not consistent within a fairness metric based on conditional statistical parity (CSP).

12. The method of claim 11, wherein said monitoring comprises calculating a plurality of conditional statistical parity values, each CSP value defining probability of a target micro-credential being issued to each demographic group; and comparing differences between CSP values to a CSP threshold.

* * * * *